May 30, 1961 G. P. DARWIN ET AL 2,986,723

SYNCHRONIZATION IN A SYSTEM OF INTERCONNECTED UNITS

Filed Feb. 26, 1960 13 Sheets-Sheet 1

INVENTORS: G. P. DARWIN
R. C. PRIM
BY Harry C. Hart
ATTORNEY

SYNCHRONIZATION IN A SYSTEM OF INTERCONNECTED UNITS

Filed Feb. 26, 1960 13 Sheets-Sheet 2

INVENTORS: G. P. DARWIN
R. C. PRIM
BY Harry C. Hart
ATTORNEY

May 30, 1961 G. P. DARWIN ET AL 2,986,723
SYNCHRONIZATION IN A SYSTEM OF INTERCONNECTED UNITS
Filed Feb. 26, 1960 13 Sheets-Sheet 3

INVENTORS G. P. DARWIN
R. C. PRIM
BY Harry C. Hart
ATTORNEY

SYNCHRONIZATION IN A SYSTEM OF INTERCONNECTED UNITS

INVENTORS: G. P. DARWIN
R. C. PRIM

BY Harry C. Hart

ATTORNEY

SYNCHRONIZATION IN A SYSTEM OF INTERCONNECTED UNITS

Filed Feb. 26, 1960 13 Sheets-Sheet 5

INVENTORS: G. P. DARWIN
R. C. PRIM

BY Harry C. Hart
ATTORNEY

SYNCHRONIZATION IN A SYSTEM OF INTERCONNECTED UNITS

INVENTORS: G. P. DARWIN
R. C. PRIM
BY Harry C. Hart
ATTORNEY

INVENTORS: G. P. DARWIN
R. C. PRIM
BY Harry C. Hart
ATTORNEY

May 30, 1961 G. P. DARWIN ET AL 2,986,723

SYNCHRONIZATION IN A SYSTEM OF INTERCONNECTED UNITS

Filed Feb. 26, 1960 13 Sheets-Sheet 8

INVENTORS: G. P. DARWIN
R. C. PRIM

BY Harry C. Hart
ATTORNEY

INVENTORS: G. P. DARWIN
R. C. PRIM
BY Harry C. Hart
ATTORNEY

INVENTORS: G. P. DARWIN
R. C. PRIM
BY Harry C. Hart
ATTORNEY

INVENTORS: G. P. DARWIN
R. C. PRIM
BY Harry C. Hart
ATTORNEY

SYNCHRONIZATION IN A SYSTEM OF INTERCONNECTED UNITS

Filed Feb. 26, 1960 13 Sheets-Sheet 12

INVENTORS: G. P. DARWIN
R. C. PRIM
BY Harry C. Hart
ATTORNEY

SYNCHRONIZATION IN A SYSTEM OF INTERCONNECTED UNITS

INVENTORS: G. P. DARWIN
R. C. PRIM
BY Harry C. Hart
ATTORNEY

United States Patent Office 2,986,723

Patented May 30, 1961

2,986,723

SYNCHRONIZATION IN A SYSTEM OF INTERCONNECTED UNITS

George P. Darwin, Summit, and Robert C. Prim, Florham Park, N.J., assignors to Bell Telephone Laboratories, Incorporated, New York, N.Y., a corporation of New York Filed Feb. 26, 1960, Ser. No. 11,269

15 Claims. (Cl. 340—147)

This invention relates to a system of interconnected units and has for its general object the establishment and maintenance of synchronism therein.

Besides having individual functions to perform, the units, which may be considered to be positioned at distinct nodes of a complex, require varying degrees of co-ordination depending upon the employment of the system. Typically, control information for co-ordinating the units is transmitted by way of channels of communications which may be viewed as "links" interconnecting the various nodes. If the units are to be synchronized their operations must take place during time intervals which have identical durations throughout the system. However, not all of the units will be operative simultaneously. Some of them may have no functions to perform during a specified period while others may be disabled. Under these circumstances there is an uncertainty as to the extent of the complex so that if synchronizing signals were constrained to originate with a fixed unit, conditions could exist under which the system would function improperly by being without central co-ordination. Accordingly, one object of the invention is to provide control circuits, identified with respective units, at a multiplicity of nodes so that the system of units forming a closed complex, namely, one having each of its nodes interlinked with at least one other node, will be self-organizing to the end that its constituent units are all mutually synchronized by a signal originating with one of the control circuits designated a primary master. The identity of the primary master for a given organization of the system depends upon the extent of its closed complex and the ranking of its control circuitry.

During the operation of a system it is often desirable to switch units in and out of a closed complex, depending upon their particular assignments. Units subjected to this kind of manipulation must be synchronized with respect to the previously operative portion of the complex. It is a further object of the invention to enable added units of a system to be organized with respect to a synchronizing control circuit previously established as a primary master. In some cases the control circuit of a newly added unit will cause the system of the augmented complex to be organized with respect to it.

Once synchronism has been attained within a given system, disturbances and disruptions may cause the units at some of the nodes to fall out of synchronism.

In particular, the primary master control circuit, or one of the links leading from it to the node in question, may suffer a casualty. Accordingly, it is a further object of the invention to detect such disturbances and disruptions and to reorganize the entire system with the automatic designation of an alternative primary master control circuit, thus to establish a new condition of syncronism throughout the system. If two separate closed complexes result from such a disturbance, each resultant part of the system will be reorganized with respect to a primary master control circuit within it.

In a narrower context synchronization is of particular importance in pulse code modulation systems where it is referred to as timing. There, distortion-free transmission of code words requires uniform spacing of message units. In furtherance of this end a common technique employed to date has been self-timing at each node of the complex by having an incoming message bit energize a local oscillator to control the time intervals of subsequently received bits. Self-timing has been reasonably adequate where the transmission of message bits has been from one node to another by way of intervening repeaters. It is unsatisfactory when time division switching takes place at nonterminal nodes of the complex because it is then necessary to interleave the message bits of newly created signals with those already occupying the communications channels. This interleaving can be done satisfactorily only when the message bits at the various nodes are identically spaced, that is, when the entire system is timed synchronously with a common frequency at each node.

Common system timing can, in principle, be effected in two ways: (*a*) on the basis of an averaging procedure, and (*b*) by using a master timer in a command structure. In the former the complex may be considered to be a "web" of links over which timing signals originating at various nodes interact with each other, making the overall timing frequency of the complex the average of the individual frequencies of the various timing circuits. Implementation of this kind of timing is difficult because of the inevitable noise disturbances present in a large system, leading to frequency instability.

In the second method of common timing, a master timer is selected to direct all units of the system over signal channels that form a "tree" of links between nodes. Since there must be a timing circuit at more than one node of the complex in order to allow for a failure of any one of them, there is a possible ambiguity as to which timer will direct the system by serving as its primary master. Accordingly, it is a further object of the invention to organize a pulse code modulation system so that all of its units are synchronized unambiguously by a single primary master.

Once a common timing command system is in operation the primary master timer may cease to function or there may be an intervening difficulty between the node of origin of the primary master signal and a node of reception. Consequently, it is a still further object of the invention to reorganize a pulse code modulation system so that untis which have fallen out of synchronism will unambiguously accept a synchronizing signal originating at a subsequently selected primary master if the originally selected primary master has ceased to function. It is also an object of the invention to reorganize a pulse code modulation system in which the primary master continues to function but with impaired transmission of its signal so that units out of synchronism will accept the signal originating at the primary master by way of a different intermediate node or a different communications link of the system.

The invention is characterized by having, at each of selected nodes of the complex, a control circuit associated with the unit directing operations there. Each control circuit generates a signal having two components. The first component is a "signature" distinctive to the node and the second is a timing signal capable of synchronizing the entire system. The signatures originating at nodes that are directly interconnected by control links are transmitted and received, that is, interchanged. At each such node the signature of highest rank is selected to designate, as synchronizer, the timing signal associated with it and to modify the originally generated node signature. Depending upon the extent of the complex and the arrangement of its control links, the modified signature is in turn selected at another node as being of highest rank, causing a control circuit there to recognize the control circuit transmitting the modified signature as its immediate master. In this way a tree synchronizing authority is established wherein each node derives its timing signal along a chain of links wherein a control circuit at one node is the primary master for the entire complex, but a control circuit at no one node has more than one immediate master, i.e., one which is but one link away. Of course, for at least one node the primary and immediate masters will be the same. When a breakdown occurs anywhere in the complex, the system clears itself of the influence of disruptive elements and reorganizes.

It is evident that one of the signatures received at a particular node must point unambiguously to the primary master timing signal and to some one path over which it is received. In general, this requires a minimum of three items of information: (*a*) the identity of the primary master node, (*b*) a measure of the quality of the channel over which its timing signal is relayed to the particular node, and (*c*) the identity of a unique immediate master node through which the master timing signal is relayed. The first item of information is obtained by assigning an individual and distinctive rank to each node of the complex capable of serving as a point of origin for a master timing signal. In a completely self-organizing system this includes every node. Information pointing to a unique immediate master node is obtained by selecting that one of highest rank of those separated by but one link from a particular node. This is done by referring to the distinct identities of the channels relaying timing signals or to code signals associated therewith. If this were not done, a particular node would not know which to select of a multiplicity of relayed timing signals originating at a primary master node.

Although in a large subclass of complexes the second information item, namely, that which measures the quality of the timing channel, may be dispensed with, it is required in the most general situation in order to insure arrival at an unambiguous solution of the problem. Moreover, it is always advantageous for the reason that the certainty of the timing of each node of the complex improves with the quality of its incoming timing information. Hence it is desirable, not only that the various nodes accept timing information from an unambiguously designated master, but also that, of various alternative channels linking a particular node with the master, the particular node shall accept the best one.

It is possible, in principle, to select any of various different measures of timing information quality, to instrument them in various ways and to keep them up-to-date as channel quality changes. In the interests of simplicity of presentation and of instrumentation the measure of channel quality adopted in the illustrative embodiment to be described below is simply the distance separating the primary master from the particular node, measured in terms of the number of links that separate them. Inasmuch as each intervening node which passes timing information along to one or more of its neighbors inevitably introduces some degradation in the quality of this information, the number of intervening links is, indeed, a measure of the degradation of the timing information and hence an inverse measure of channel quality.

The invention provides the identifying information by having the signature transmitted by each control node consist of three digits, respectively designating the primary master node (digit 1), the distance between the master node and the particular node (digit 2), and the identification of the particular node (digit 3). It is to be noted that the term "digit" is used in its wide sense, since it refers to a designation which may contain a great number of the numerals conventionally employed in arithmetic processes. For example, in a system containing one thousand nodes each digit of the signature could adopt any value between 1 and 1,000.

When the signature transmitted from one node is received at another node, its third digit serves to identify a possible immediate master for the control circuit at the node of reception. Once received, this identification need not be relayed to any other node and it is relegated to a fourth digit position. Consequently, the signature generated by a particular control circuit contains four digits of which only the first three are transmitted. The digits respectively designate the primary master node (digit 1), the distance separating the primary master node from the particular node (digit 2), the identity of the particular node (digit 3), and the immediate master node (digit 4) which is digit 3 received from an immediately adjoining node.

When the system is first activated the signature and timing information at a particular node are self-generated. As a result the digits are, respectively, *j*, *o*, *j* and *j* where *j* designates the rank of the particular node. Initially, the self-generated signature (*jojj*) at each particular node is placed in storage by being preset in its register, while its control circuit may be simultaneously receiving the signatures transmitted from other nodes of the complex. To eliminate confusion during organization, comparison of incoming and preset signatures is prevented until a substantial number of the nodes have completely registered their preset designations. The delay interval required depends upon the number of nodes in the complex. When the delay is terminated, an active comparison process begins in which the three-digit signatures transmitted from immediately adjoining nodes are compared on a digit-by-digit basis with three digits (1, 2, and 4) of the signature in storage. Whenever the compared portion of the stored signature is greater than the incoming signature, it is supplanted in the register by the latter. The comparison process continues until the smallest, i.e., highest ranking, of the incoming signatures has been entered into the register. The third incoming digit stored as digit 4 and designating the node serving as the relay source or immediate master for the timing information originating at the primary master node, directs a timing selector causing the timing signal transmitted from the immediate master to become the timing signal of the particular node. As a result the system is self-organized so that the units at each node of the complex operate in synchronism.

The self-organization of the complex remains unaltered unless the synchronizing timing signal fails or the received signature which has selected the timing signal fails or increases. The first event, that is, failure of the timing signal, may result from a failure of the timer at the primary master node or from an intermediate failure in the transmission from an adjoining node. By the same token an increase in the registered signature portends either a failure at the primary master node or at some intermediate position. This is because the failure produces a reorganization at intervening nodes with an attendant increase in transmitted signatures. When the increase takes place there is no effect at a particular node unless special alarm means are provided, since a given control circuit functions by selecting the lowest incoming signature, otherwise allowing an increase to pass by unnoticed.

A timing failure is detected by a timing monitor alarm. When the incoming timing signal selected by the fourth digit of the stored signature ceases to appear, the delay generator used during the organization period is set into operation. The register is cleared and preset to allow a reorganization of the complex after termination of the transient delay interval.

An increase of the minimum signature stored in the register is detected by a signature monitor alarm which may be a stepping switch with an input terminal connection for each adjoining node. The position of the stepping switch is determined from the fourth digit of the stored signature, thus identifying the immediate master. Only two of the digits need to be monitored by the stepping switch. They are the digit 1 identifying the master node and the digit 2 designating the distance of the particular node from the master node. By continuously comparing the monitored digits with their counterparts stored in the register, the condition for an increase of the minimum signature is quickly detected whereupon the delay generator activated previously is set into operation, commencing the process that leads to system resynchronization.

The kind of synchronization contemplated by the invention is applicable regardless of the kinds of communications channels interlinking the nodes of the complex or whether they extend over great or negligible electrical distances. However, for the purpose of eliminating collateral considerations, such as those associated with channel imperfections, the invention is hereafter largely discussed in terms of a system whose control signals are transmitted over identical, ideal channels with infinitesimal command propagation times from node to node.

Many techniques for implementing the objects recited above will be apparent after a consideration of a few preferred embodiments of the invention, taken in conjunction with the drawings, in which.

Figure 6A:
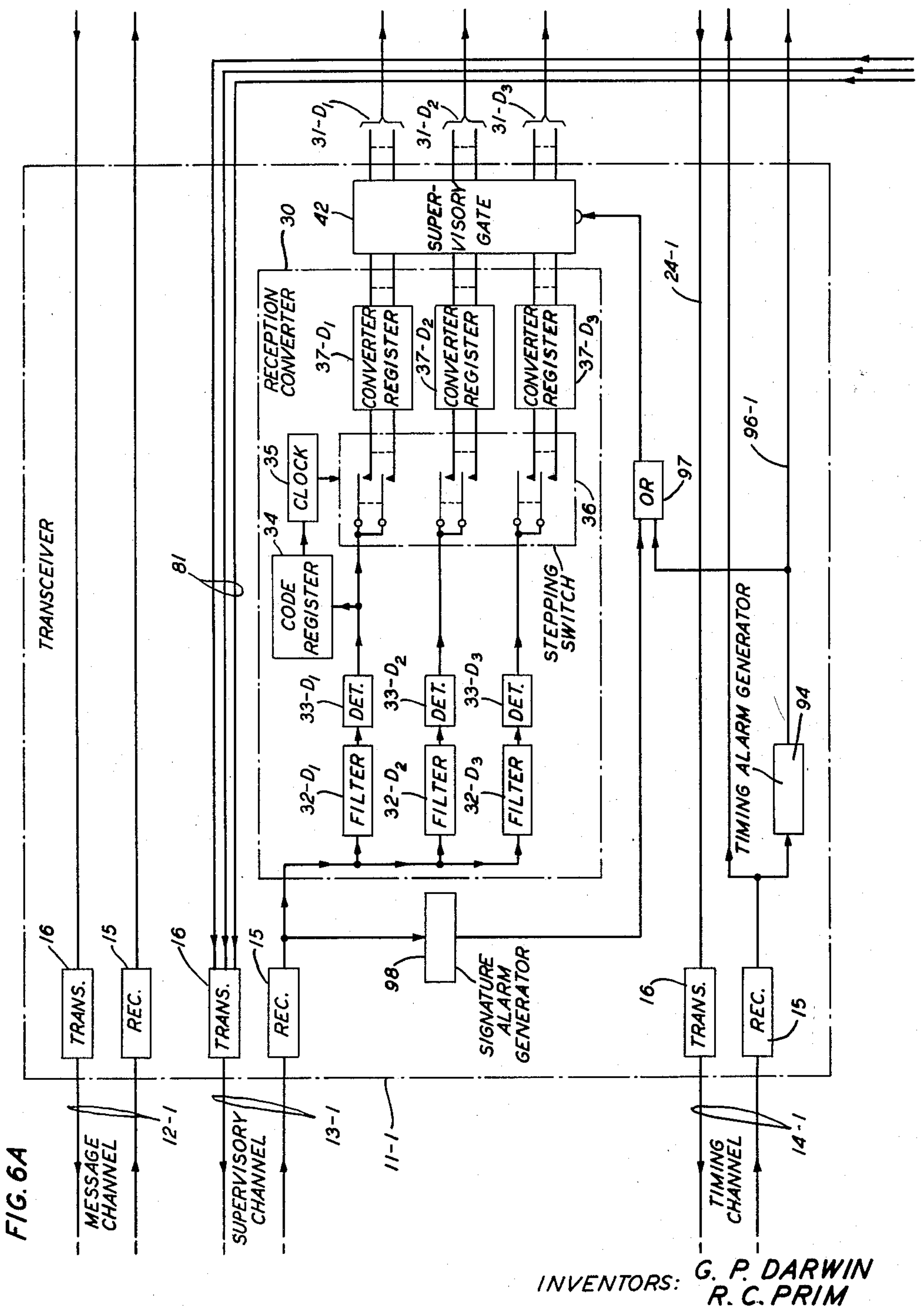
Figure 6B:
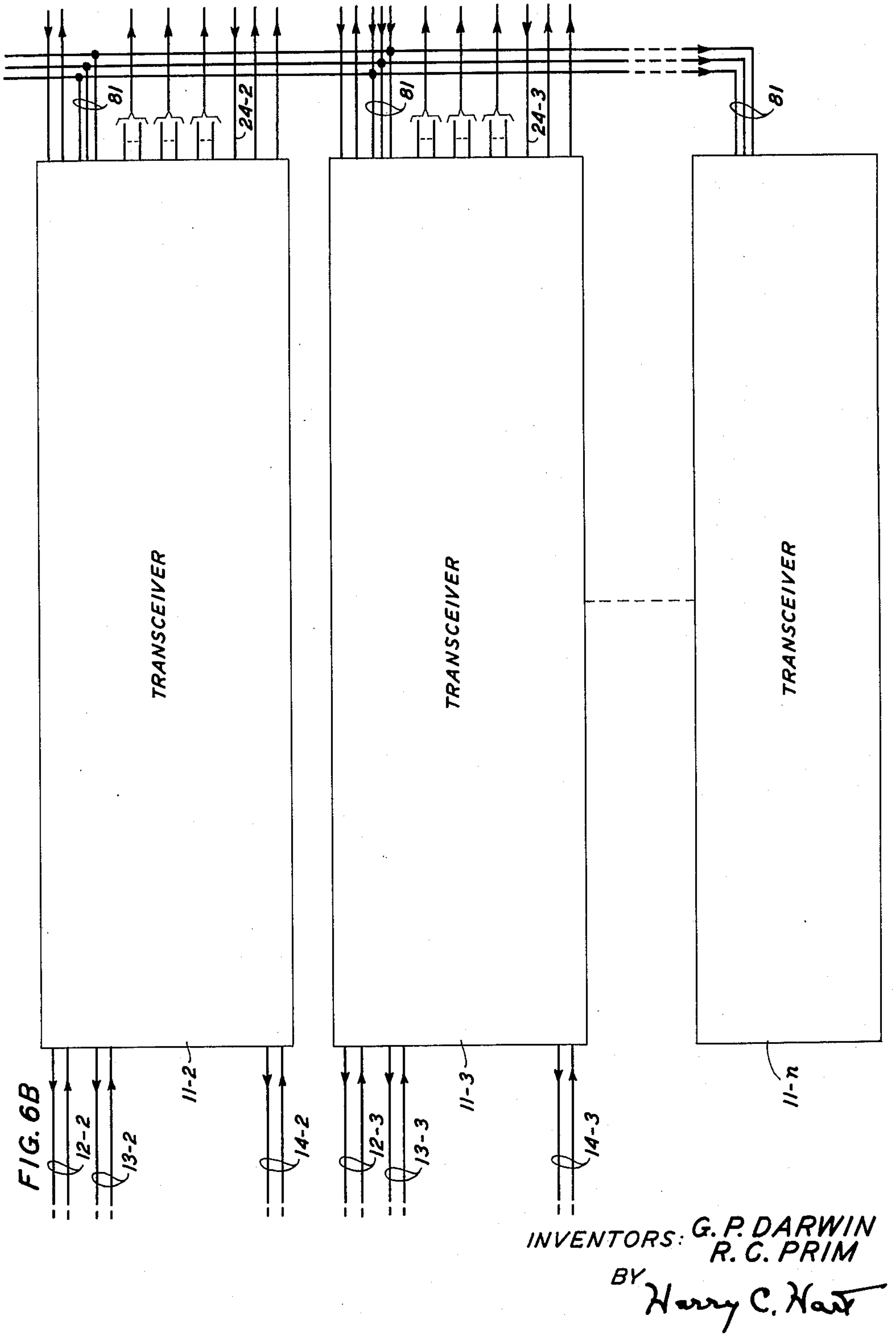
Figure 6C:
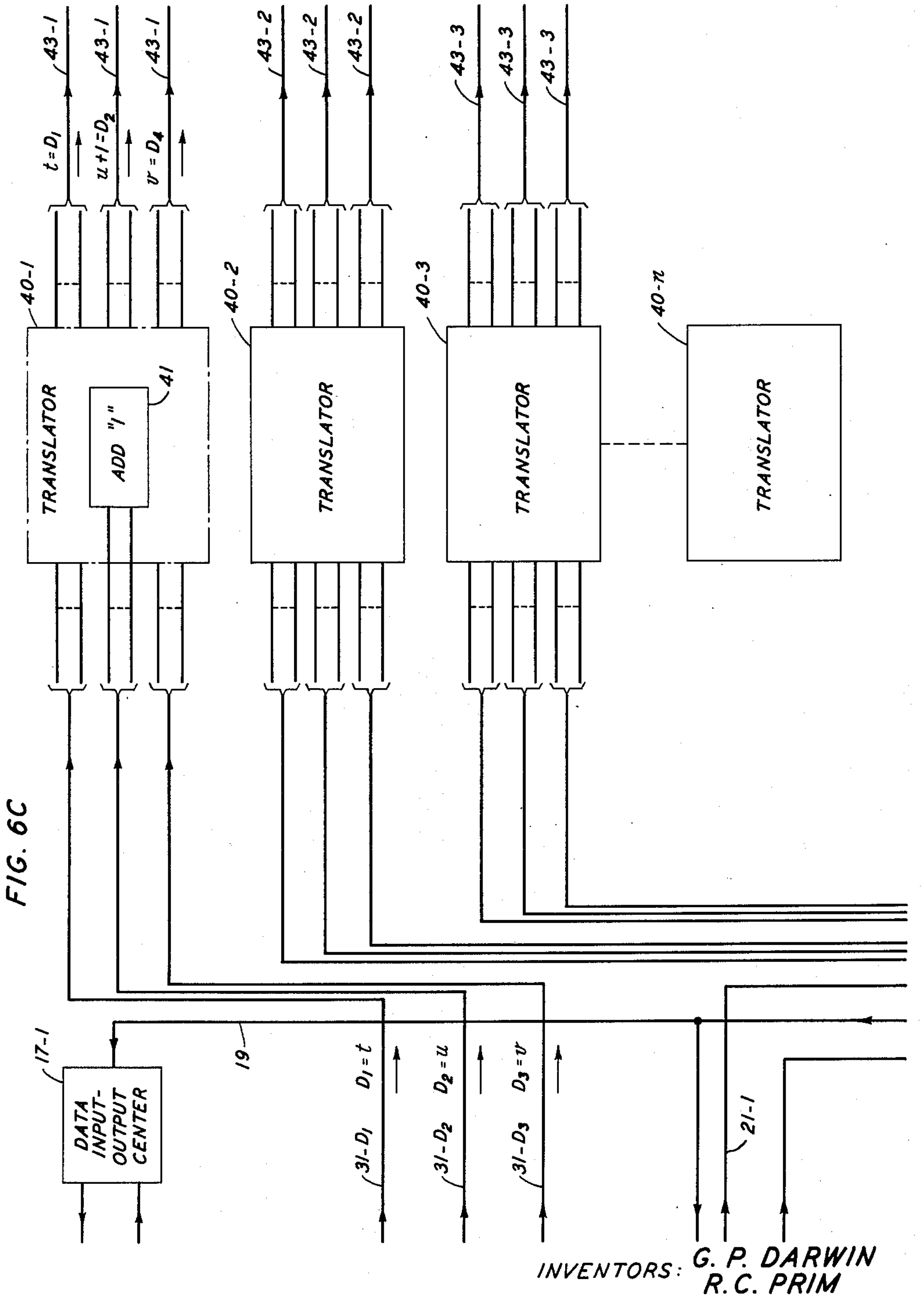
Figure 6D:
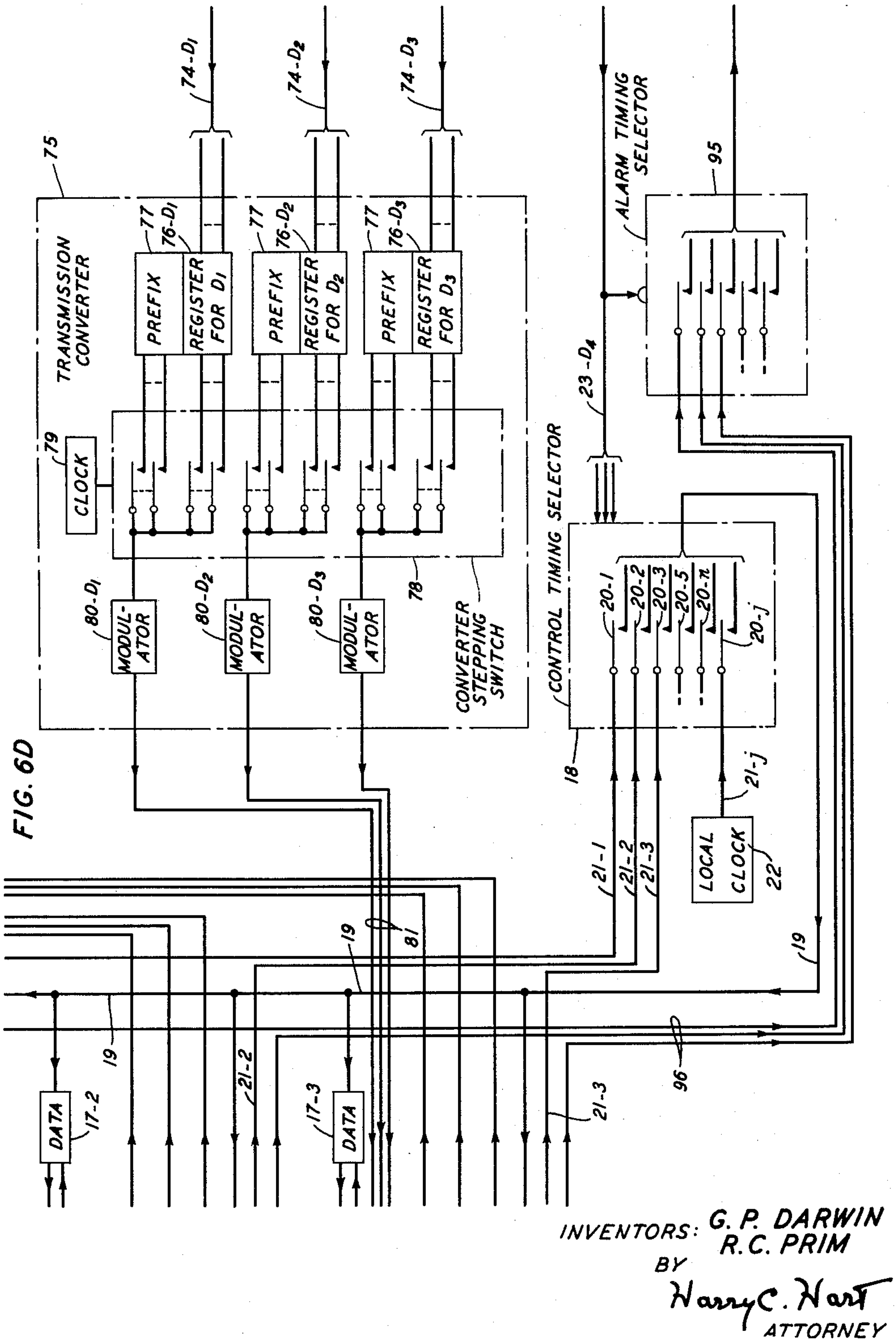
Figure 6E:
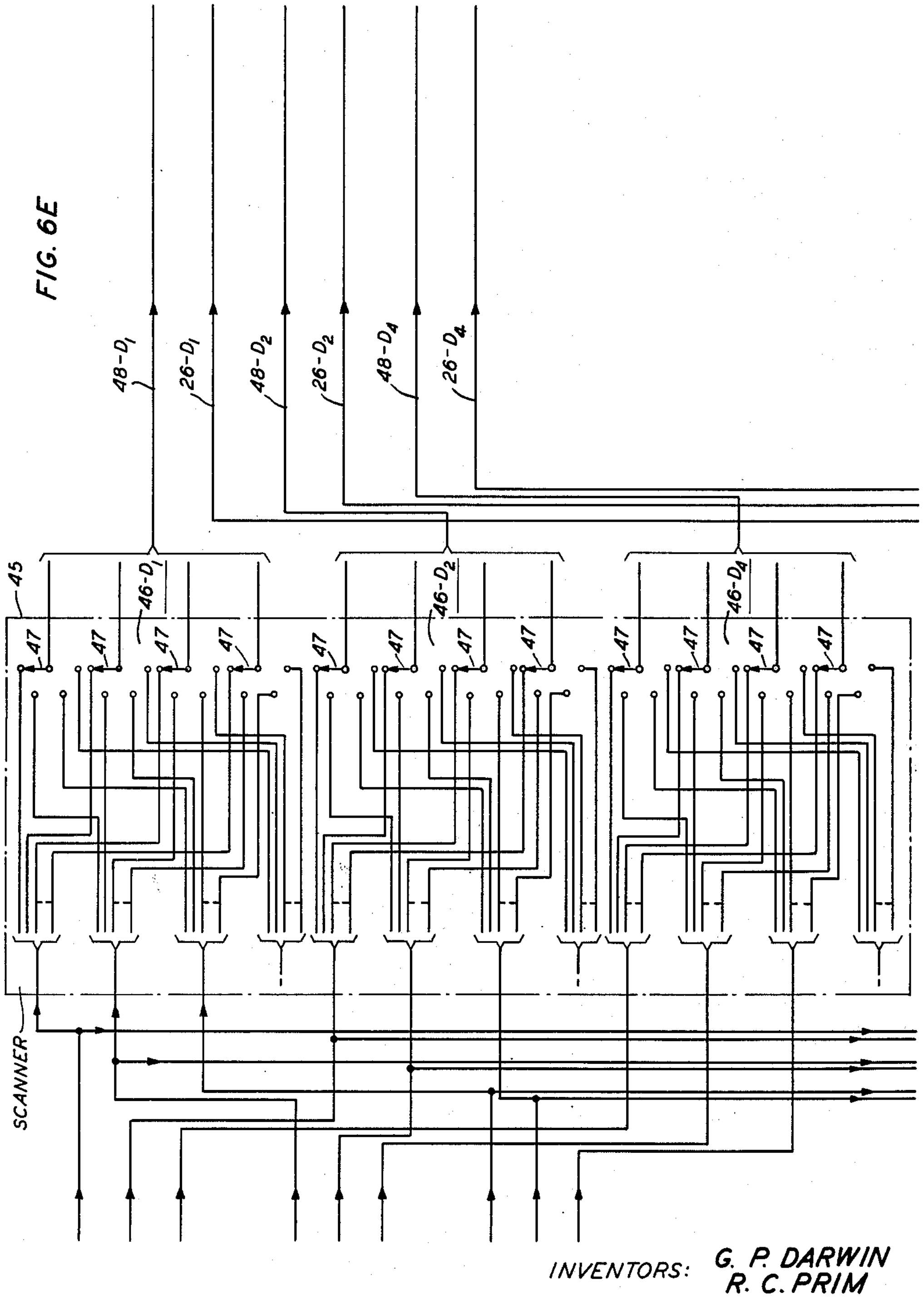
Figure 6F:
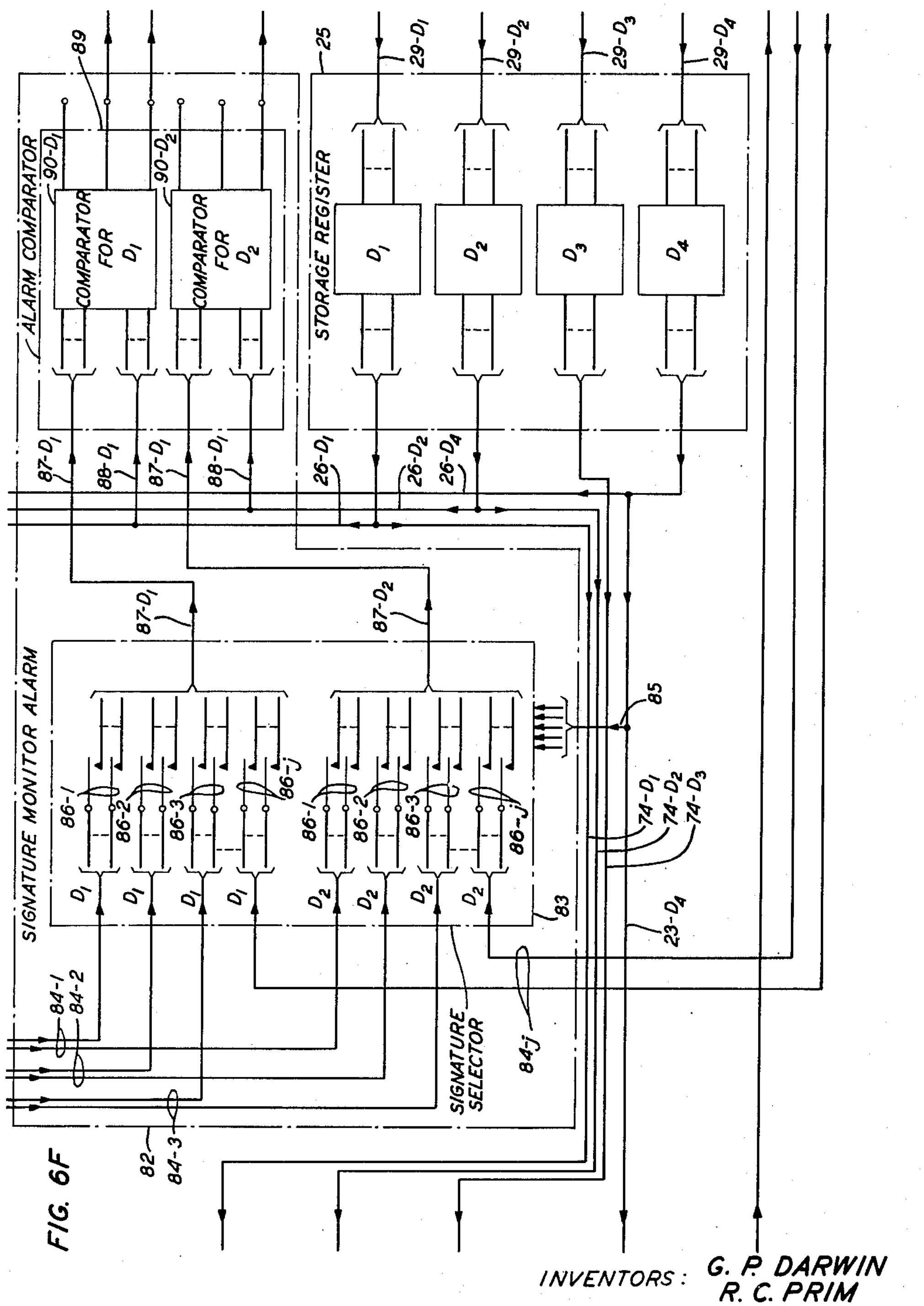
Figure 6G:
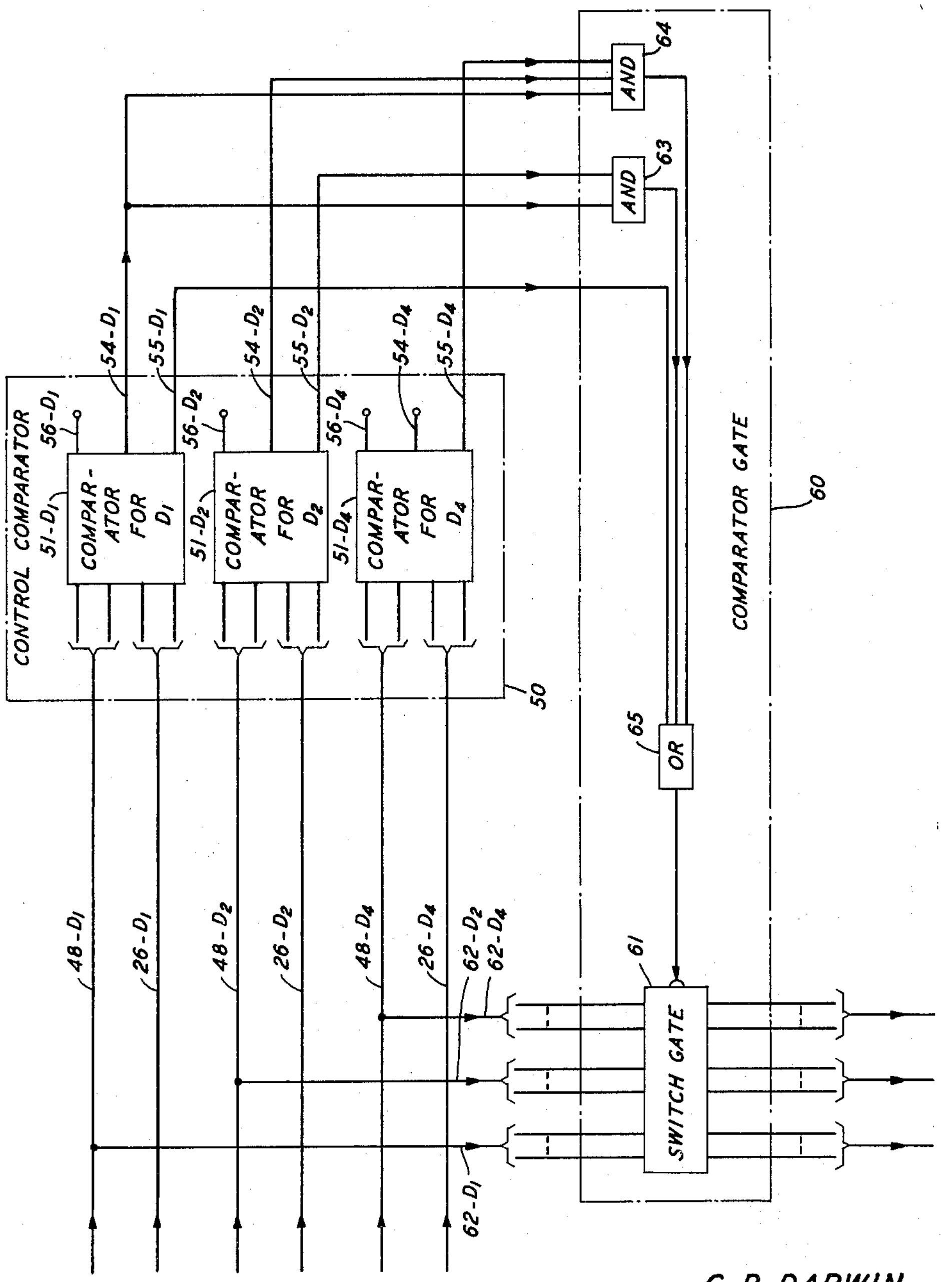
Figures 6H, 7:
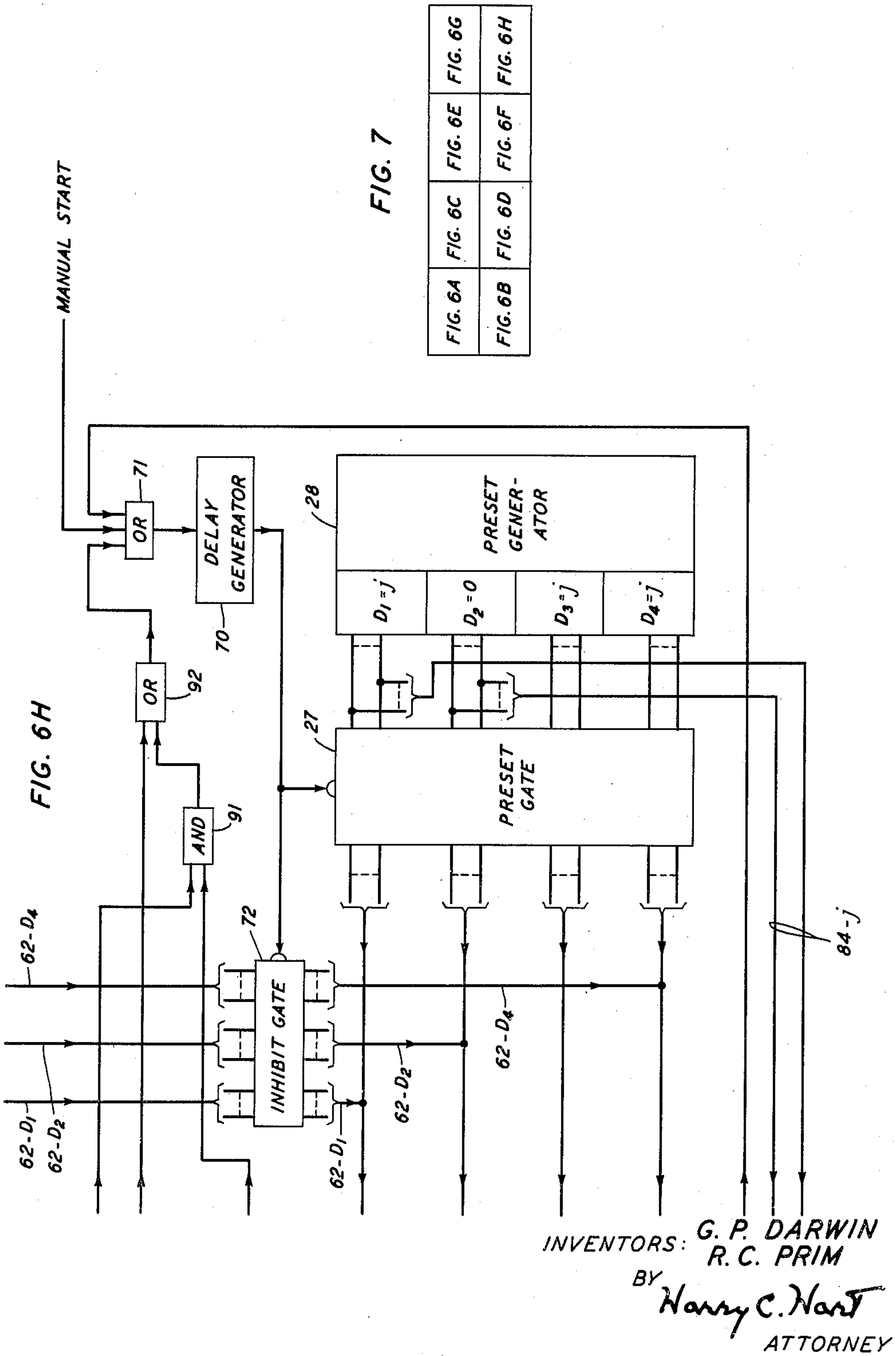
Figure 8:
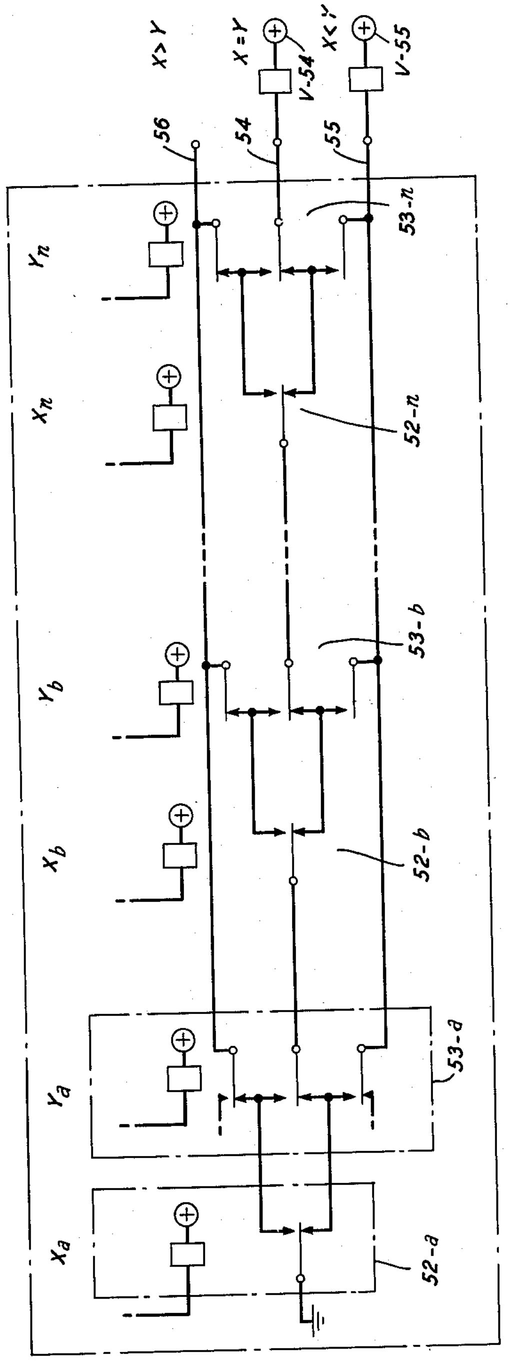

Figs. 6A–6H, taken together as indicated in the key, Fig. 7, is a circuit diagram of a complete control circuit; and Fig. 8 is a circuit diagram of the comparator employed for each digit processed in the circuit of Figs. 6A–6H.

Figure 1A:
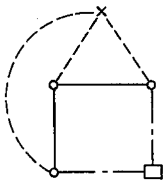
Figs. 1A–1C are schematic diagrams of various complexes whose nodes are interconnected by channels of communications called links.

The invention is best understood by beginning with a consideration of the complex in Fig. 1A showing a general system and its subordinate complexes. The nodes indicated by small circles represent units containing control and operational circuitry. These nodes are interconnected by communications channels marked by solid line links. There is an additional node of the operating complex identified by an *x*. The channels of communications interconnected it with other nodes of the complex are identified by dashed lines. It does not have any control circuitry and must rely on self-timing for its synchronization. A further node of the complex marked by a small rectangle and connected to other nodes by dot-and-dash links contains control circuitry alone. It provides an alternative way of transmitting control signals. Fig. 1A indicates that the operating complex with operating circuitry and the control complex with control circuitry need not be coextensive.

Figure 1B:
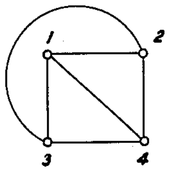

In the control complex of Fig. 1B the nodes of the complex designated by small circles are numbered sequentially in accordance with a scale of precedence which, as a practical matter, may be determined on the basis of the stability of the timing oscillators positioned at each node though, from the standpoint of the present invention, it is arbitrary. A link symbolized by a solid line interconnects each pair of nodes. It provides a two-way channel of communications over which signatures generated by the control circuits at the various nodes can be passed in both directions. Assuming that a minimum numeric designation indicates highest rank, e.g., greatest stability, the oscillator at node 1 is the primary master for the entire system and the control circuits at all other nodes derive their synchronization signals directly from it.

Figure 1C:
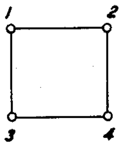

When a system becomes very large, it is neither practical nor necessary to provide a direct communications link between each node and every other node. Rather, the arrangement of Fig. 1C may be used in which each node is connected with but two adjoining ones, thus providing alternative transmission paths. Assuming that the oscillator at node 1 is the primary master, it can no longer transmit its message directly to node 4. It must rely on retransmission either from node 2 or from node 3. According to the invention, the control circuit at the node with the higher rank, that is with lower numeric designation, takes precedence and becomes the immediate master for node 4 whose oscillator is accordingly synchronized by a signal originating at node 1 and relayed through the immediate master node 2. The alternate transmission path by way of node 3 goes into effect in the event of a casualty at node 2.

Figure 2A:
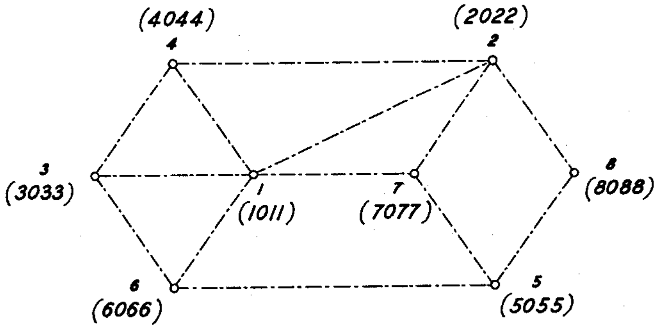
Figs. 2A–2C are schematic diagrams illustrating the self-organization of a system whose constituent units are at distinct positions of a nodal complex.
Figure 2B:
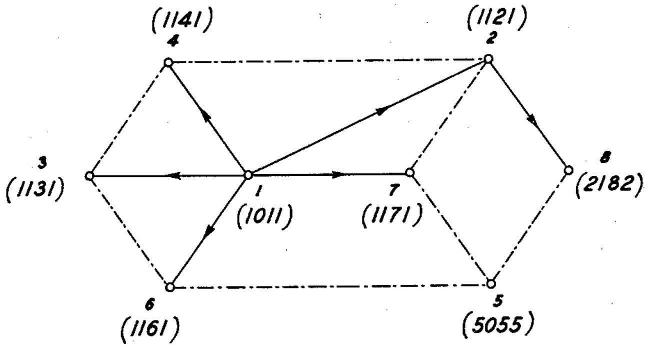
Figure 2C:
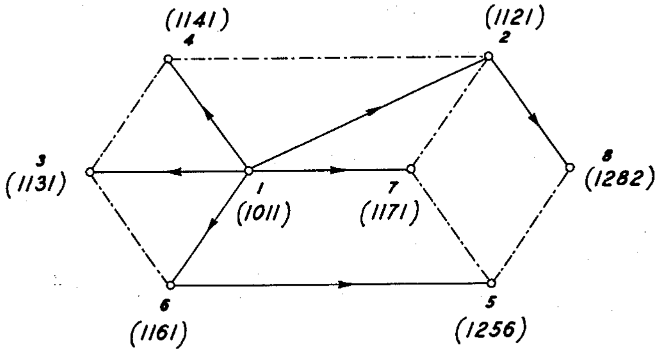

To illustrate how the units of a system are initially organized to render the entire system synchronous, reference is made to Fig. 2A showing serially numbered nodes having a master oscillator at each one accorded the priority indicated by its numeric rank. The links between nodes are shown dashed to indicate that initially no synchronizing channels have been established before the system is activated. As discussed previously, in the absence of a signal from an adjoining node there is generated at each particular node a signature distinctive to it. Since the positions of the constituent digits respectively indicate the primary master node (digit 1), the distance between the master node and the particular node (digit 2), the particular node (digit 3), and the immediate master node (digit 4), the initial signature at each node must be in the form (*jojj*) where *j* is the numeric rank of the particular node. This follows because initially the oscillator at each node is its own primary master and its own immediate master and clearly does not receive its signature from any other source. For example, the signature of node 6 is (6066). Other node signatures are shown in parentheses in Fig. 2A beside the numeric designations of particular nodes. As the self-organization of the system proceeds the first three digits of every nodes signature are transmitted to each adjoining node and compared with the first, second and fourth digits there registered. On the understanding that, in the present illustration, "distance" is measured in terms of the number of links that separate the particular node from the primary master, each received signature has its second place digit augmented by unity to account for the additional link then separating a given node of origin and a given node of reception. For example, at node 4 the signatures compared are (111) from node 1, (212) from node 2, and (313) from node 3. These signatures are compared with the self-generated signature at node 4, namely, (404), whereupon the control circuit associated with the oscillator at node 4 decides that the signal emanating from node 1 is of the highest order and the signature at node 4 is modified accordingly by having the digit identifying it interspersed between the second and third digits of the signature received from node 1 so that the new signature at node 4 becomes (1141). The transient signatures associated with the other nodes of the complex are indicated in Fig. 2B. It is to be noted that the transient signature at node 8 is (2182). The control circuit at node 8 must choose between nodes 2 and 5 in selecting its immediate master. It chooses the former because of its lower rank. However, the signature (1121) at node 2 cannot be propagated to node 8 immediately, and during the transient period the control circuit at node 8 instead recognizes the earlier signature (202) which is modified on reception to (2182). In like fashion node 5 is of higher rank than any of its immediate neighbors, nodes 6, 7 and 8, so that its signature during the transient period is the self-signature (5055). The tree of synchronizing authority is established as indicated by the solid line links interconnecting the nodes of the complex in Fig. 2B. The arrows attached to these links indicate the direction of propagation of the synchronizing signals. At some time during the transient period the organized control circuits begin transmitting their new signatures to their neighbors. When this happens, as shown in Fig. 2C, the control circuit at anode 2 relays the digits 112 which become the signature (1282) at node 8. In a similar fashion the modified signature at node 6, namely, (116), is recognized at node 5 as (126) which is smaller than (505) so that the final signature there becomes (1256).

Figure 3A:
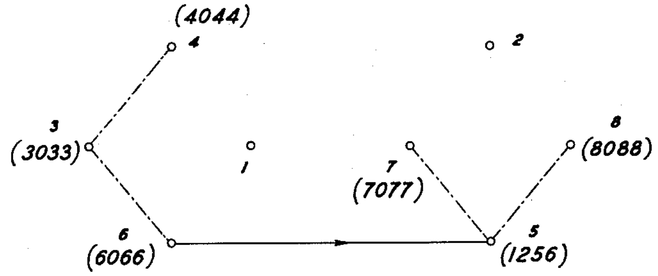
Figs. 3A–3E are schematic diagrams illustrating the self-reorganization of the complexes of Figs. 2A–2C.
Figure 3B:
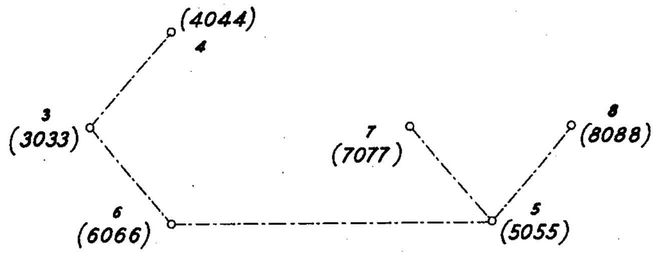
Figure 3C:
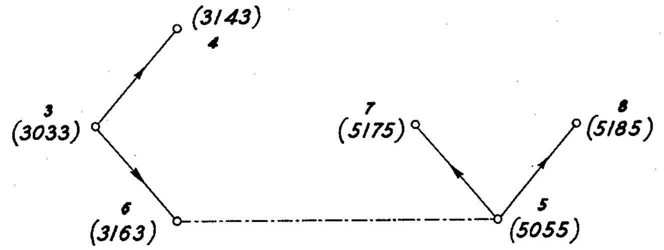
Figure 3D:
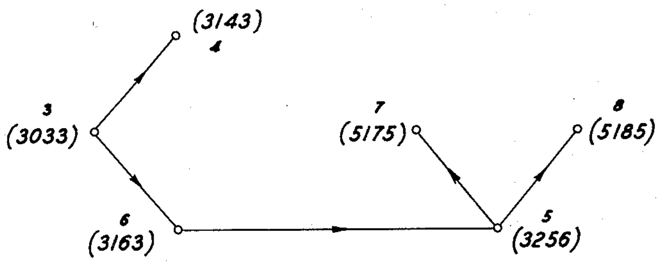
Figure 3E:
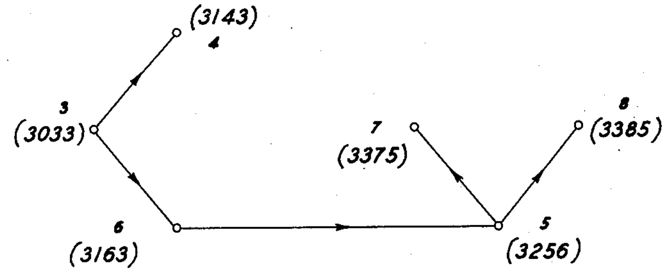

A self-reorganization of the system takes place whenever the timing signal originating at the primary master node fails. Assuming casualty to nodes 1 and 2, the complex of Fig. 2A initially enters its clearing condition as illustrated in Fig. 3A. Those nodes at which synchronizing signals are no longer received from an immediate master node, namely, 3, 4, 6, 7 and 8, quickly return to an autonomous state and their control circuits produce self-generated signatures. Node 5 continues to recognize node 6 as its immediate master and selects its timing signal accordingly. It is because all nodes are not cleared immediately that a delay period is necessary in the reorganization as well as the organization of the system. During the clearing period the control circuit at each node of the complex registers its self-generated signature as shown in Fig. 3B, thus allowing the reorganization to commence as indicated in Fig. 3C on termination of the delay interval. Circuits at nodes 4 and 6 accept the signature originating with node 3 while circuits at nodes 7 and 8 look to node 5 in seeking an immediate master. By the end of the first portion of the transient period node 5 has acknowledged node 6 as its immediate master as shown in Fig. 3D but has not yet had an opportunity to relay the primary master signal originating with node 3 to its "slave" nodes 7 and 8. At the end of the transient period the reorganization is complete as portrayed in Fig. 3E. If in Fig. 2C only the timing signal relayed from node 1 by way of node 6 were affected by having the relay transmission from node 6 to node 5 fail, the control circuit at node 5 continues to recognize node 1 as the primary master, but it chooses node 7 as its immediate master so that the final signature at node 5 becomes (1257). Node 7 is preferred over node 8, since the relayed signature from the latter, (138), is larger than (127).

Figure 4:
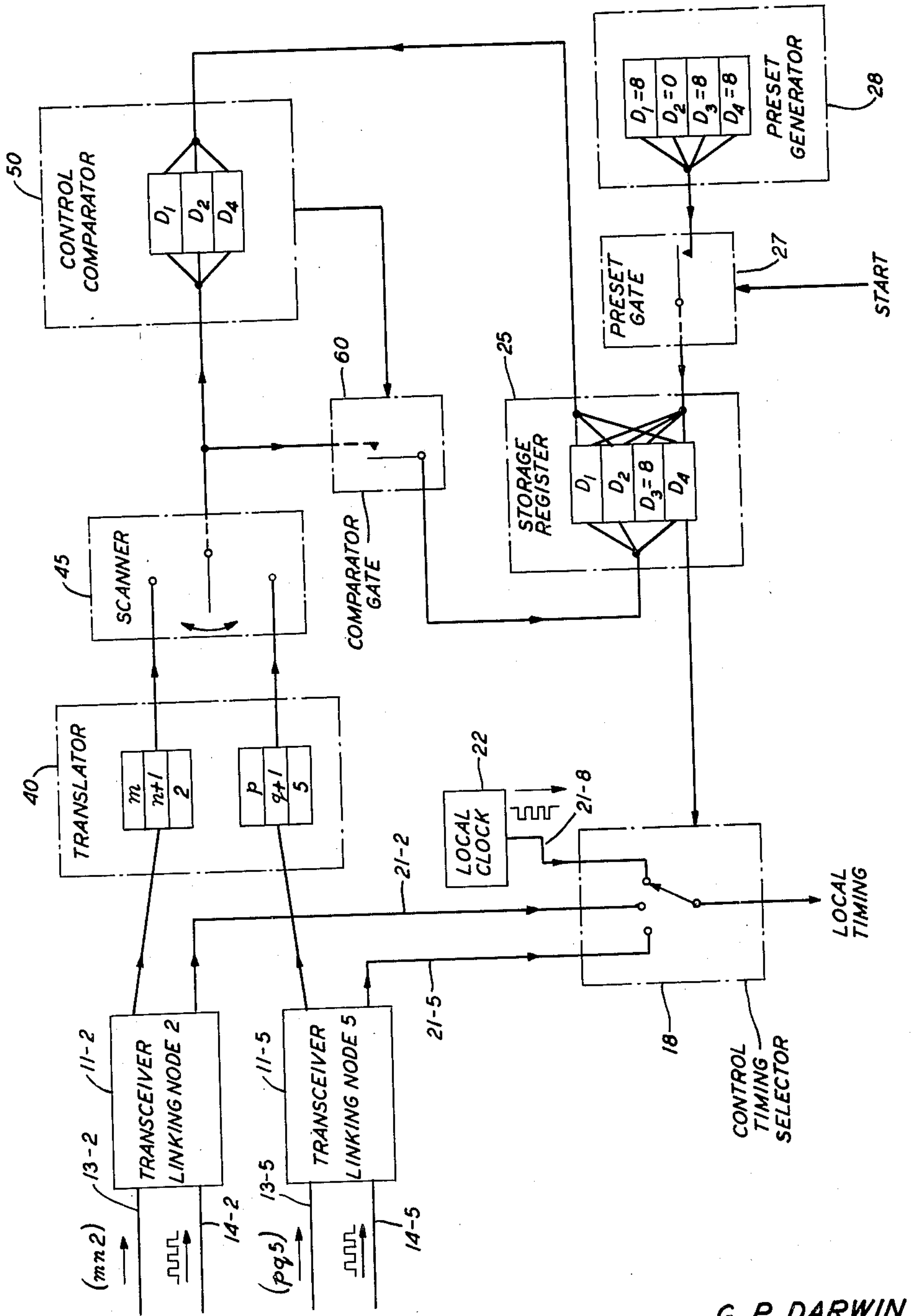
Fig. 4 is a block diagram of a control circuit at each node of the complexes of Figs. 2A–2C illustrative of self-organization at a particular node of the system.

The apparatus at a particular node, such as 8, for carrying out the self-organization described in conjunction with Figs. 2A–2C is shown in block diagram form in Fig. 4. As in Figs. 2A–2C, the control circuit illustrated is intended for a node having linkages with but nodes 2 and 5 of the complex, only two transceivers, 11—2 and 11—5, are needed, one for each linkage. At each transceiver 11 the received control signal from an adjoining node contains supervisory and timing information, carried by respective supervisory and timing channels 13 and 14. The timing information at both transceivers 11 is routed directly to a control timing selector 18. Pending selection of one of the timing leads 21, local operations are directed by a local clock 22. On the other hand, the three-digit signature of the supervisory information is subjected to a comparison process. Before this can take place there must be a signature in storage in the storage register 25. At the commencement of the organization process a start pulse closes a preset gate 27 causing the register 25 to store the self-signature (8088) produced by the preset generator 28.

Turn now in Fig. 4 to the incoming signatures (*mn*2) and (*pq*5) on the supervisory channels 13—2 and 13—5 respectively linking nodes 2 and 5. If the second digits *n* and *q* of the incoming signatures represent the distance in links between the adjoining nodes and the primary master node, they are augmented by unity to account for the unit separation between an immediate master and the node of the instant control circuit. This is accomplished, for the signature from each adjoining node, in a translator 40 which passes the incoming signatures to a scanner 45. At the scanner 45 the signatures successively sampled and applied in the form ($D_1D_2D_4$) to a control comparator 50 in which a signature already stored in the register 25 is compared with that sampled by the scanner 45. Whenever an incoming signature is of higher rank than the compared portion of that previously set in the register 25, the comparator gate 60 is closed, and a new signature is in turn stored in the register. Only the first, second and fourth of the four digits, $D_1$, $D_2$, $D_4$, stored in the register 25 participate in the comparison process inasmuch as the third digit $D_3$ designates the rank of the local node and the received signatures themselves have but three digits. The fourth digit $D_4$ of the signature operates the control timing selector 18 and causes it to make contact with the appropriate one of the timing leads 21. During the transient period before the adjoining nodes 2 and 5 have been enslaved to their masters, their control circuits transmit the self-signatures (*mn*2=202) and (*pq*5=505) which are converted to (212) and (515) by the translator 40 at node 8. Assuming the signature transmitted from node 5 is sampled first by the scanner, the comparator detects that (515) is smaller than (808) producing a pulse that closes the comparator gate 60. This scanned signature is read into the storage register 25 causing the node signature to be modified from (8088) to (5185). When the signature dispatched by node 2 is sampled, the comparator 50 notes that (212) is smaller than (515) and the stored signature becomes (2182), or the transient signature at node 8 shown in Fig. 2B. After the control circuits at nodes 2 and 5 become enslaved to the primary master at node 1, their relayed signatures are (122) and (135). Being the smallest of the subsequently compared signatures, (122) is entered into the register 25 where it reads (1282), the final signature of node 8 in the organized complex of Fig. 2C. The fourth digit, 2, in turn directs the timing selector 18 to select the timing lead 21—2 associated with the transceiver 11—2 obtaining a timing signal from node 2 and the local timing is prescribed accordingly.

The first three digits $D_1$, $D_2$, $D_3$ of the stored signature are relayed along with the timing signal selected by the fourth digit $D_4$ to adjoining nodes through the transceivers 11. The means for doing this are omitted in the interest of diagram clarity.

Figure 5:
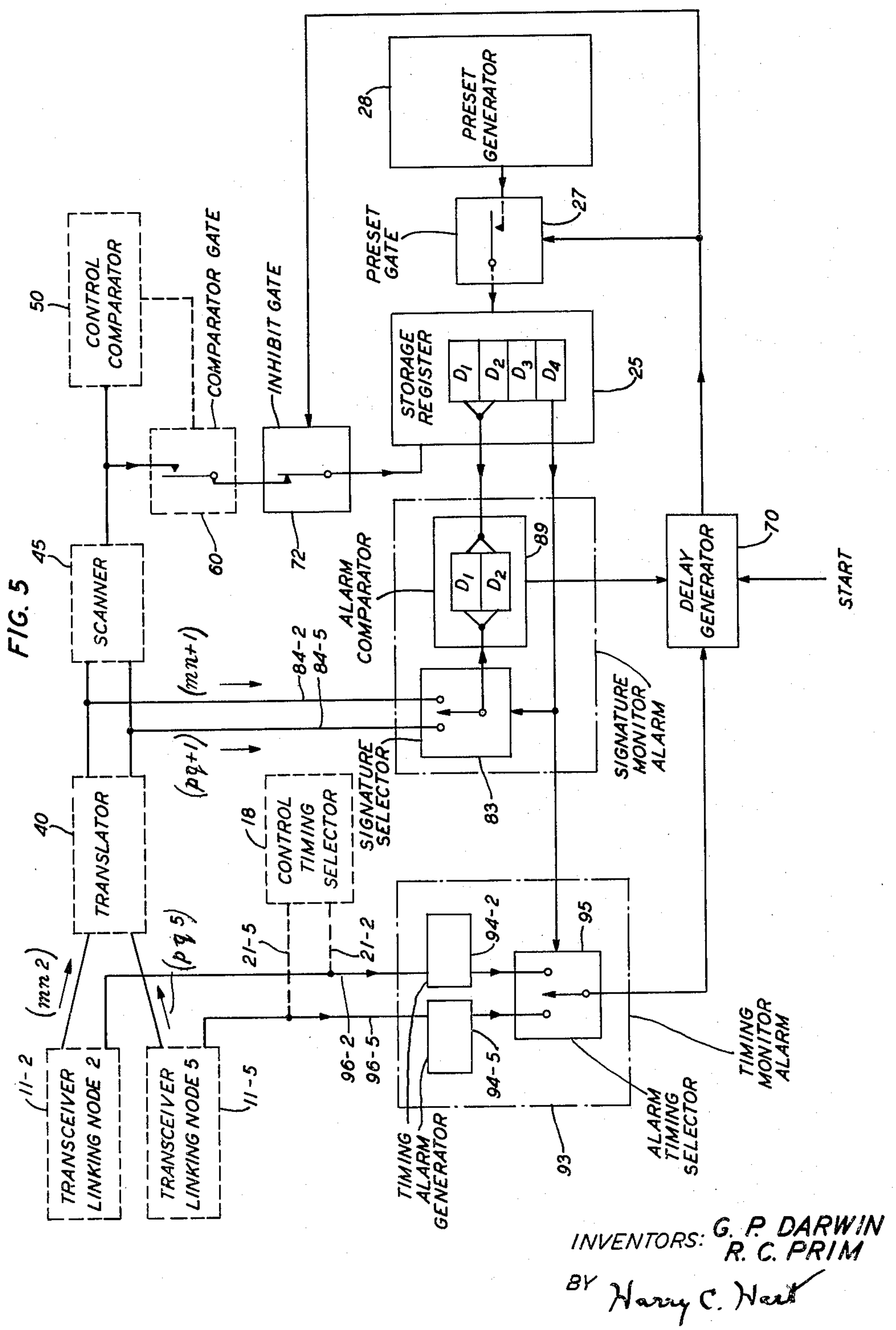
Fig. 5 is a block diagram similar to that of Fig. 4 supplemented by alarm circuits which respond to disturbances in system synchronization and illustrative of self-reorganization at a particular node of the system.

By way of explaining the reorganization of the system when it is in an alarm state, the block diagram of Fig. 4 has been supplemented as shown in Fig. 5 with certain of the original blocks of Fig. 4 shown only in outline form. As noted earlier there are two conditions under which the system must reorganize. Both of these stem from a timing failure which may originate either at the primary master node or at an intermediate node.

A failure at the primary master is evidenced by an increase of the signature of the immediate master node relaying the timing signal. This is a consequence of the return to an autonomous state of an immediate master when the primary master has failed. If there were no method of detecting this increase the comparator 50 would continue to accept the signature stored in the register 25 as being of highest rank. Consequently, the timing selector 18 would continue to select the synchronizing signal from a previously established immediate master. In fact, however, proper synchronization of the system might require the designation of a different immediate master. This is made possible by providing a signature monitor alarm 82 which operates in the manner of a stepping switch. It is directed to select the input line 84 responsible for the signature stored in the register 25 as of a given instant. The selection is easily made by having the fourth digit $D_4$ in the register 25 operate a signature selector 83 that is similar to that of the control timing selector 18. The first two digits $D_1$ and $D_2$ of the incoming signature are continuously compared in an alarm comparator 89 with corresponding digits $D_1$ and $D_2$ stored in the register 25. Whenever the selected incoming signature increases, an alarm pulse is produced that activates a delay generator 70 which in turn opens the switch of an inhibit gate 72 between the control comparator 50 and the register 25. The delay interval introduced by the delay generator 70 endures sufficiently long to allow all disabled units of the system to clear themselves of signatures no longer valid. During the delay interval the alarm pulse closes the preset gate 27, enabling the self-signature of the preset generator 28 to return to storage in the register 25. Termination of the alarm pulse restores the path through the inhibit gate 72 and allows the reorganization process to commence.

The second kind of timing failure may originate at the primary master node or at some intermediate position. A supervisory signal may continue to be received, with its signature designating a particular timing line 21, but if there is no signal on the selected timing line, synchronization at the particular node and at all other nodes choosing it as an immediate master will be disrupted. The timing failure may be at an intermediate node which may receive the originally transmitted timing signal from the primary master without error but fail to make a retransmission. Or it may be in one of the channels. Regardless of how the failure occurs, it is detected by a timing monitor alarm 93 which has a timing alarm generator 94 for each transceiver 11. The fourth digit $D_4$ stored in the register 25 is used to direct the alarm timing selector 95 to select from among the alarm leads 96 that one connected to the transceiver 11 monitoring the signature in storage. When the selected timing signal ceases to appear the delay generator 70 is once again activated causing the control circuit to return to its autonomous state in the fashion discussed above.

The complete control circuit at each particular node necessary to effect self-organization and self-reorganization of a pulse code modulation system is shown in Figs. 6A–6H. Separate transceivers 11 (Figs. 6A–6B) are provided to handle information dispatched to and received from each adjoining node. For facility in exposition, a message channel 12, a supervisory channel 13 and a timing channel 14 for each transceiver 11 are each indicated by distinct input and output leads associated with respective receivers 15 and transmitters 16. In practice, the three kinds of information accommodated by these channels may be coded so that either a single channel or a double channel will suffice.

A typical message channel 12—1 (Fig. 6A) carries conventional PCM message code words which originate locally or are received from some other unit of the system. In either case the message code words are handled by a data input-output center 17—1 whose operations are synchronized by a master timing signal.

Like the message channel 12—1, a typical supervisory channel 13—1 (Fig. 6A) also carries PCM message code words but it has a smaller capacity inasmuch as the transceived signatures contain but three digits in binary code. To facilitate identification, each digit may be modulated by a carrier signal with a distinctive frequency or it may be prefaced by a pre-established code word.

The information carried by each timing channel 14 (Figs. 6A–6B) is in the form of equally spaced pulses or a carrier signal derived from a stabilized oscillator. The timing signals received by the various transceivers 11 are relayed by respective timing leads 21 to a control timing selector 18 (Fig. 6D) whose connection to a particular lead depends upon the fourth digit $D_4$ of the signature in the storage register 25 (Fig. 6F). The selected timing signal is carried directly by a timing output lead 19 (Fig. 6D) to the data input-output centers 17 to effect local synchronization. The control timing selector 18 is, in effect, a switch with an individual tongue 20 for each of the timing leads 21. An appropriate switch is a relay tree of the kind shown on page 308 of "The Design of Switching Circuits" by Keister, Ritchie, and Washburn (Van Nostrand, 1951). Such a relay tree is energized by signals carried by a control bundle 23 having as many leads as there are bits in the digit $D_4$, stored in the register 25 and doing the selecting. Depending upon the binary sequence of pulses applied, a particular relay is activated causing one of the tongues 20 to close. For example, if the fourth digit in storage is 5, signifying that the incoming timing signal relayed from or originating at node 5 is to be selected to direct local timing, three leads of the control bundle 23, interconnecting the control timing selector 18 and that portion of the register 25 containing the fourth digit in storage, would respectively contain signals in the sequence 101 which is the binary equivalent of 5. This combination of signals is able to energize only the relay controlling the tongue 20—5 associated with the timing lead connected to the transceiver receiving the timing signal originating at node 5 and the timing output signal is prescribed accordingly. One of the timing leads **21–*j* is connected directly to a local clock 22 which is a master oscillator. Whenever the fourth digit of the storage register prescribes that the local control circuit is to be the master for the system, that tongue 20–*j* of the switch associated with the local clock 22 is activated. Regardless of its origin, the timing signal selected by the control timing selector 18 becomes identified with the local control circuit and it is relayed to each adjoining node through the output leads 24** (Figs. 6A–6B) associated with the timing channels of the various transceivers. The timing alarm mechanism of the timing channel will be discussed subsequently when system reorganization is considered.

Turn now to a typical supervisory channel 13—1 (Fig. 6A). The incoming signature thereon is processed in a reception converter 30 in order to transform the series coding of digit bits in time sequence to parallel coding that makes the constituent bits of the digits $D_1$ $D_2$ and $D_3$ simultaneously available on separate leads in bundles 31 thereof. When the digits have carriers of different frequencies, they are separated by appropriately tuned bandpass filters 32, one for each digit, and demodulated by respective detectors 33. Then the bits of a selected digit, e.g., $D_1$ are read into a code register 34. As soon as the register 34 is occupied with a code sequence indicating that a subsequently received bit marks the commencement of a digit $D_1$, a clock timing circuit 35 is activated. This causes a stepping switch 36 tied to an incoming line for each digit to make contact with successive leads of a converter register 37 from which parallel readout of each digit is made. If the digits are not received simultaneously, it is necessary to have a separate code register 34 for each along with supplementary gating to allow readout of the converter registers 37 only when they are all occupied. The implementation of the reception converter components is well known in the computer and telephone arts. In the absence of an alarm condition the three digits of the incoming signature pass to a translator 40 (Fig. 6C) through a supervisory gate 42 (Fig. 6A) which opens only in the event a disturbance is sensed by its associated transceiver 11. Assume that the digits $D_1$, $D_2$ and $D_3$ entering a particular translator 40—1 have the values $t$, $u$ and $v$, respectively. The translator passes $t$ and $v$ without change, but it relegates $v$ to a fourth place position of digit $D_4$ to account for the reservation of the third digit position to indicate the rank of the local node. As far as the bits of the digits themselves are concerned, only those associated with $u$ or digit $D_2$ are altered. Since the second digit represents the distance between a particular node and the primary master node, it must be augmented by unity to account for the fact that the local node is one link beyond each adjoining node. The unit addition is made by a conventional binary adder 41 as is well known in the art.

The output digits $D_1$, $D_2$ and $D_4$ from the translators are sent by respective bundles 43 of leads to a scanner 45 (Fig. 6E) having a rotary switch 46 for each digit. The rotatable wipers 47 of the switches have as many ganged blades as the digit scanned contains bits. The wipers 47 for the three digits rotate in unison allowing the entire incoming signature from a control circuit at an adjoining node to be sampled simultaneously. The signature is conveyed by separate bundles 48 of conductors for the respective digits to a control comparator 50 (Fig. 6G) made up of constituent comparators 51, one for each digit. Within each constituent comparator 51 there are two sets of relays. The first set has as many elements as there are bits in the scanned digit. The second set is connected to the appropriate one of bundles 26 of leads interconnecting the output of the storage register 25 (Fig. 6F) and the input of the control comparator 50 (Fig. 6G). Depending upon how the digits being compared energized their relays, a signal will appear on one of the three output leads of each constituent comparator 51. If the digits are equal corresponding ones of the relays will function and the signal appears on an equivalence lead 54. When the digit scanned is less than that in storage the comparator signal is available only on the command lead 55. The condition for which the scanned digit is greater than that in storage is of no importance and the output lead 56 so responding is unconnected. A typical constituent comparator 51–$D_1$ is shown in more detail in Fig. 8.

According to the invention, when the scanned signature is less than its stored counterpart, it should replace the latter in the register 25. When this condition is detected by the control comparator 50, a comparator gate 60 (Fig. 6G) is actuated allowing the scanned signature to pass directly into storage through normally open relays of a switch gate 61 in the paths of the bundles 62 of leads interconnecting the control comparator 50 and the storage register 25.

The control comparator gate 60 functions on a digit-by-digit basis through the use of two subordinate AND gates 63 and 64 and one subordinate OR gate 65. These gates may be formed from relays in the fashion described on page 37 of Keister et al., supra. If scanned digit $D_1$ is less than digit $D_1$ in storage, the signal on the command lead 55–$D_1$ for digit $D_1$ causes the comparator OR gate 65 to close the normally open relays of the switch gate 61 to achieve a direct replacement of three of the stored digits $D_1$, $D_2$, $D_4$ by the incoming signature. If the scanned digit $D_1$ is equal to the digit $D_1$ in storage, the signal on the equivalence lead 54–$D_1$ for digit $D_1$ is applied to a first terminal of a two-digit AND gate 63, and if, simultaneously, the second digit $D_2$ of the incoming signature is less than the second digit $D_2$ in storage, the signal on the equivalence lead 55–$D_2$ for digit $D_2$ is applied to the second terminal of the two-digit AND gate 63, which then closes the previously described comparator OR gate 65. A replacement of three of the stored digits also takes place when scanned and stored digits $D_1$ and $D_2$ are equal, but scanned digit $D_4$ is less than that in storage. The equivalence leads 54–$D_1$ and 54–$D_2$ for digits $D_1$ and $D_2$ along with the command lead 55–$D_4$ for digit $D_4$ operate a three-digit AND gate 64 which once again causes the comparator OR gate 65 and the switch gate 61 to close.

The register 25 (Fig. 6F) where the complete four-digit signature of the local control circuit is stored is made up of locking relay register elements of the kind shown on page 449 of Keister et al., supra. One such element is provided for each bit to be placed in storage. For convenience the bits of a particular digit are compartmentalized to simplify lead arrangements. Signals propagated along various bundles 29 of incoming leads energize associated relay windings to institute the holding action of a locking ground. The relays return to normal when the ground contact is disrupted. The design and operation of this kind of register is well known in the art.

The comparison process requires reference digits in the storage register 25. These are provided by a preset generator 28 (Fig. 6H) whose contacts are adjusted to produce the self-signature of the local node. When needed, the self-signature, $D_1=j$, $D_2=o$, $D_3=j$, $D_4=j$, enters the register 25 (Fig. 6F) through the closure, by a pulse originating with a delay generator 70, of normally open switches of a preset gate 27 containing one set of relays for each digit. The delay generator 70 responds to the output of an OR gate 71 whose input depends upon whether system organization or reorganization is taking place. For system organization a manual start pulse is applied to the OR gate 71. To prevent the instability that would result from having incoming signatures enter the register during the period when it is being set with its self-signature, the delay generator 70 opens the normally closed switches of an inhibit gate 72 connected in series with the previously described switch gate 61 (Fig. 6G).

Digits $D_1$, $D_2$ and $D_3$ in the storage register 25 (Fig. 6F) form the signature transmitted from the particular node to each adjoining node. The transmitted signature is relayed by respective bundles 74 of leads to a transmission converter 75 (Fig. 6D) which performs the inverse function of the reception converter 30 by preparing the parallel coded bits for serial transmission to other nodes. There is a register 76 for each outgoing digit with a section 77 of relays generating the identifying prefix code. A converter stepping switch 78 is driven by the pulses emitted from a local clock timing source 79 so that successively sampled bits in storage appear in time sequence at associated modulators 80 where each outgoing digit is given a distinctive frequency preparatory to transmission of the outgoing signature to adjoining nodes. Converter output leads 81 convey the signature to a transmitter 16 for each supervisory channel, as typified by the channel 13—1 in Fig. 6A. It does not matter that under some circumstances the stepping switch may begin to function without having read out the entire prefix code since a reception converter at an adjoining node will not respond to a transmitted signature until its code register is energized.

Consequently, once the manual start pulse is applied at a particular node to read a preset self-signature into storage, subsequently a continual comparison process takes place so that the control circuit at the node selects that one of the incoming signatures which is less than the corresponding digits of its own signature in storage and modifies the node signature and the timing of local operations accordingly. A like process occurs throughout the system, causing it to become self-synchronized with respect to a timing signal originating with an unambiguously selected master node.

The system must be reorganized in the event of a system disturbance of the kind discussed in conjunction with the block diagram of Fig. 5. The signature monitor alarm 82 (Fig. 6F) detects an increase of the incoming signature responsible for that present in the storage register 25. A signature selector 83 of the kind used in the timing selector 18 (Fig. 6D), with tongues 86 and controlled by the leads of the selector bundle 85, is employed for digits $D_1$ and $D_2$ of an incoming signature. Paired bundles 84 of leads handling those digits are connected to each translator and the preset generator 27 (Fig. 6H). The bundles 84–$j$ of leads to the preset generator 27 are needed only to prevent ambiguity where the self-generated signature is stored in the register 25. In that case the fourth digit $D_4$ of the stored signature could as well direct the selector, by means of signals on the selector bundle 85, to an unconnected terminal of the selector 83 since it is not possible for the preset signature to change its value. The respective outputs 87 are compared with corresponding outputs 88 of the storage register 25 in an alarm comparator 89 whose constituent components 90 are of the kind employed in the control comparator 50 (Fig. 6G). The associated AND and OR gates 91 and 92 (Fig. 6H) operate in the manner described for the comparator gate 60 (Fig. 6G). If the selected incoming digit $D_1$ is greater than that in the register 25 the resulting output pulse of the alarm comparator 89 activates a first OR gate 92 which in turn activates a second OR gate 71 causing the delay generator 70 to function. Should the first digits be equal but the second selected incoming digit $D_2$ be greater than that of the second digit $D_2$ in storage, the resulting output pulses are applied to an AND gate 91 and an OR gate 92, in turn, once again causing the delay generator 70 to begin its operating cycle.

Reorganization of the system is also necessary if the signal on the timing channel 14 fails. This is achieved by a timing monitor alarm. There is a timing alarm generator 94 (Fig. 6A) of the relay variety in each timing channel 14. It responds only when no timing signal is received. Generally, the timing signal is a train of equally spaced pulses, and the alarm generator 94 may be a normally closed relay with a time delay lasting beyond the anticipated separation interval of timing wave pulses. The pulse produced by the alarm generator 94 is sent by alarm leads 96 through an alarm timing selector 95 (Fig. 6D) of the kind similar to that used in the control timing selector 18. The transmitted pulse activates the delay generator 70 (Fig. 6H) used previously and causes the reorganization process to commence. However, corrective circuitry is also necessary in the supervisory channel. Otherwise, at the end of the clearing period, assuming unimpaired reception of the signature associated with the timing channel that has failed, the timing control selector would once again be directed to select the faulty timing channel. This is provided by disabling the supervisory channel 13 (Fig. 6A) associated with the defective timing channel 14 through the use of a supervisory gate 42. The signal generated by the timing alarm passes through an OR gate 97 and causes the supervisory gate 42 to substitute for the incoming signature on the supervisory channel 13 a self-generated alarm signature consisting of a sequence of digits larger than any receivable from a node of the system. The relay contactors needed for producing the alarm signature may be of the kind used in the preset generator 27 (Fig. 6H). As a result the minimum signature placed in storage will be other than that connected with the defective timing channel. Since the supervisory gate alone produces the same reorganization result as the timing alarm generator in combination with the alarm timing selector, the latter combination is not strictly needed to cope with timing channel failures. Nevertheless, the use of an alarm timing selector gives a more rapid response to a timing failure than would be possible from having the timing alarm generator operate only upon the supervisory gate.

In addition to a failure of the timing signal or an increase of the supervisory signature, it is possible for an incoming signature itself to fail. This condition is detected by a signature alarm generator 98 whose output is directed to an OR gate 97 which is also responsive to the timing alarm generator 94.

The constituent comparators (Fig. 6G) employed for each digit in the control circuit may be of the relay variety shown in Fig. 8. Such a comparator results from combining simple relays, each having a pivoted tongue normally against a back contact, but displaceable against a front contact in response to a signal applied to the relay winding. An incoming relay 52 of the simple variety is employed for each of the incoming digit bits, designated $X_a$ through $X_n$. For each of the storage digit bits, designated $Y_a$ through $Y_n$, there is a storage relay 53 compounded from three simple relays by having the back contact of a first component joined to the front contact of a second component whose back contact is in turn joined to the front contact of a third component. Relay pairs, formed by symmetrically bridging a storage relay with an incoming relay, are aligned in parallel. The tongues of the first components of the storage relays are tied together by an output lead 56, while the tongues of the third components are tied together by a command lead 55. The tongue of each incoming relay, except the first 52–*a*, which is grounded, is connected to the tongue of the second component of a storage relay in an adjoining pair. When the digits being compared are equal, there is a continuous current path that extends through the second component of each storage relay, and an output signal appears on the equivalence lead 54 of the comparator. For example, if digit $D_1$ incoming and $D_1$ in storage are both equal to 3, $X_a$, $Y_a$, $X_b$, and $Y_b$ are energized since the binary equivalent of 3 is 11. Consequently, current supplied by the equivalence lead bias battery V–54 is able to flow successively through the front contacts of relay 52–*a*, of the second component of relay 53–*a*, of relay 52–*b*, and of the second component of relay 53–*b*, the tongues of these relays having moved from their positions normally occupied by virtue of the signals applied to their associated windings. When the compared digits are unequal, only the case where that incoming is less than that in storage is of interest. Then at least one of the storage relays will be energized, while its paired incoming relay will not be, with the result that at some stage of the comparator a completed circuit will be effected through the back contact of an incoming relay 52 and thence through the front contact of a third component of a storage relay 53 causing the signal to appear on the command lead 55. For example, if digit $D_1$ incoming is 1 and digit $D_1$ in storage is 3, in a possible implementation of the comparator relays 53–*a*, 53–*b* and 52–*b* are energized. Current supplied by the command lead bias battery V–55 is able to pass successively through the back contact of incoming relay 52–*a* and the front contact of the third component of the storage relay 53–*a*. The fact that relays 52–*b* and 53–*b* are also energized is immaterial since the path formed by them is interrupted at relay 52–*a*. The equivalence and command leads 54 and 55 convey signals present on them to relays which act in turn to operate AND and OR gates 63, 64, and 65 in Fig. 6G the control circuit.

The control circuit for effecting system reorganization as herein discussed has relied upon the employment of relay switches throughout. It is apparent that the necessary circuit components could be wholly or partly electronic as, for example, in the case of the scanner which could employ a ring counter constructed from vacuum tube or solid state elements. Furthermore, instead of having the signatures handled in their binary form, the reception converter could employ a decoder to translate each digit into a voltage level dependent upon its value. Various techniques are possible in handling the signature identifying a particular node. It may be used in its entirety to direct the control timing selector; it may be stored only in part in the register to facilitate comparison with incoming signatures; or it may be partly used to augment incoming signatures at the scanner. Additionally, other coding schemes and modes of identifying digits will occur to those skilled in the art.

What is claimed is:

1. In a system of interconnected units for carrying out preassigned operations in a fashion co-ordinated through the distribution among them of primary synchronizing information, said primary synchronizing information normally originating with a preassigned unit designated a primary master, similar control circuits located in the several units and responsive to the impaired reception of said primary synchronizing information for reorganizing said system to accept, unambiguously, alternative synchronizing information, each of which circuits comprises means for producing and registering a signature unique to the control circuit and unambiguously identifying said primary synchronizing information, means for causing each unit to transmit its registered signature to all other units, means for causing each unit to compare all incoming signatures with its own registered signature to provide a control signal, and means for altering said registered signature under the joint control of said control signal and of said incoming signatures.

2. In a system of interconnected units, each of said units having a rank associated therewith and being controlled to carry out preassigned operations in a fashion co-ordinated through the distribution among them of synchronizing information, said synchronizing information normally originating with the unit of highest rank, similar control circuits located in the several units and deriving a synchronizing signal from said unit of highest rank, each of which circuits comprises means for producing and registering a signature unique to the control circuit and indicative of its rank, means for causing each unit to transmit its registered signature to all other units, comparator means for causing each unit to compare all incoming signatures with its registered signature to provide a control signal indicative of the difference between the unit of highest rank prescribed by said incoming signatures and the unit of highest rank prescribed by said registered signature, and control means under the joint control of said control signal, when of a preassigned character, and of said incoming signatures for altering said registered signature, whereby said units are unambiguously synchronized, as prescribed by said registered signature, with respect to said unit of highest rank and, on failure to receive said synchronizing information of highest rank, said units are unambiguously resynchronized, as prescribed by a subsequently registered signature.

3. Apparatus as defined in claim 2 wherein said registered signature contains three digits successively designating (*a*) the rank of a primary master unit, (*b*) the rank of the registering unit, and (*c*) the rank of the immediate master unit relaying the synchronizing signal of said primary master unit to said registering unit, said comparator means comprises means for comparing, on a digit-by-digit basis, the incoming signatures with said registered signature and selecting the smallest thereof less than said registered signature, and said control means comprises means for replacing the digits of said registered signature by corresponding digits of the selected signature.

4. Apparatus as defined in claim 3 wherein said registered signature further contains a digit designating the distance between said primary master unit and said registering unit, further including means for modifying said incoming signatures to account for the increase in distance between said immediate master unit and said registering unit.

5. In a system of interconnected units, each of said units being controlled to carry out preassigned operations in a fashion co-ordinated through the distribution among them of synchronizing information, said synchronizing information normally originating with a preassigned unit designated a master, similar control circuits located in the several units and responsive to the failure of said master for reorganizing said system to accept, unambiguously, synchronizing information originating with a different one of said units designated an alternative master, each of which circuits comprises means for producing a signature unique to the control circuit and unambiguously identifying said master, means for registering a first portion of said signature, means for causing each unit to transmit a second portion of said signature to all other units, means for causing each unit to compare all incoming portions of signatures with that portion of its signature previously registered, and means for causing each unit to accept the smallest of the compared portions as its subsequently registered portion, forming a subsequent signature of said control circuit unique thereto and unambiguously identifying said alternative master.

6. In a system of units interconnected by channels of communications, selected ones of said units being positioned within a complex at distinct nodes thereof, a control circuit in each of said selected units, which comprises means for generating a signal identifying the node of said circuit and for timing the unit thereat, means for transmitting said signal to adjoining nodes interlinked with said node, means for receiving the signal generated at each adjoining node interlinked with said node, means for comparing the generated and received signals, means for selecting the smallest thereof to direct the timing at said node, whereby the units of said complex are self-synchronized to accept unambiguously the timing information originating with one of said control circuits which is designated a primary master and, on the failure thereof, the units of said complex are self-resynchronized to accept unambiguously timing information originating with a different one of said control circuits which is designated a secondary master.

7. In a system of operating units interconnected by channels of communications, a control circuit in each of said units, which comprises means for generating a control signal comprising a synchronizing signal and an identifying signature associated therewith, means for registering said signature, means for transmitting said control signal to othher control circuits of said system, means for selecting the smallest of the incoming and registered signatures and modifying the registered signature accordingly, and means for selecting said synchronizing signal associated with said modified registered signature whereby said system is continuously self-organized with respect to a master, said master being that one of said control circuits having the smallest of said signatures, and, on the failure of said master, said system is self-reorganized with respect to an alternative master.

8. Similar control circuits for synchronizing the operating units of a system, one of said circuits being positioned at each node of a complex of said units and interconnected with others of said circuits by channels of communications, each of which circuits comprises means for generating a self-signature of said node, means for generating a self-timing signal identified with said self-signature, means for placing said self-signature into a storage register accommodating the registered signature of said node, means for transmitting said registered signature and the timing signal associated therewith to all adjoining nodes of said complex directly interconnected with said node, means for receiving at said node the registered signatures and associated timing signals from said adjoining nodes, means for translating said signatures to include the distance between said node and said adjoining nodes, means for successively scanning the translated signatures, means for comparing successively scanned signatures with said registered signature, means for selecting the smallest of the compared signatures and entering it into said storage register to become the registered signature of said node, means for selecting the timing signal associated with said registered signature whereby the timing signal directing operations at said node originates with an unambiguously identified master node of said system, as relayed through an unambiguously identified one of said adjoining nodes, so that said system is self-organized.

9. Similar control circuits as defined in claim 8 further including monitor alarm means for detecting the impaired reception of said smallest compared signature, delay means responsive to said monitor alarm means, means responsive to said delay means for preventing the entry into said storage register of said compared signatures for a delay interval, means responsive to said delay means for causing said self-signature to be placed in said storage register whereby, on termination of said delay interval, the timing signal associated with said signature then available at said node is selected to direct operations thereat, said timing signal originating with an unambiguously identified, alternative master node of said system, as relayed through an unambiguously identified one of said adjoining nodes, so that said system is self-reorganized.

10. Similar control circuits as defined in claim 8 further including timing alarm means for detecting the impaired reception of the selected timing signal and activating said monitor alarm means whereby, on termination of said delay interval, the timing signal associated with the smallest of the signatures then available is selected to direct the operation at said node, said timing signal either originating with an unambiguously identified alternative master of said system or relayed through an unambiguously identified alternative one of said adjoining nodes, so that said system is self-reorganized.

11. Similar control circuits for synchronizing the operating units of a system, one of said circuits being positioned at each node of a complex of said units and interconnected with others of said circuits by channels of communications, each of which circuits comprises means for generating a two-part self-signature of said node, a portion of said self-signature being common to both parts thereof, means for generating a self-timing signal identified with said self-signature, means for placing said self-signature into a storage register accommodating the two-part registered signature of said node, a portion of said registered signature being common to both parts thereof, means for transmitting the first part of said registered signature and the timing signal associated therewith to all adjoining nodes of said complex directly interconnected with said node, means for receiving at said node the first part of registered signatures and associated timing signals from said adjoining nodes, means for translating received signatures to indicate for each adjoining node the degradation of the timing signal transmitted therefrom, means for successively scanning the translated signatures, means for comparing successively scanned signatures with the second part of said registered signature, means for substituting for said second part of said registered signature the smallest of said scanned signatures less than said second part to form a replacement two-part registered signature of the particular node, and means for selecting the timing signal associated with said registered signature whereby the timing signal directing operation at said particular node originates with an unambiguously identified master node of said system, as relayed through an unambiguously identified one of said adjoining nodes, so that said system is self-organized.

12. In a system of interconnected units, each of said units being co-ordinated by information originating with one of their number designated a master, similar control circuits located in the several units, responsive to the presence of said information for organizing said system with respect to said master and responsive to the failure of said information for reorganizing said system to accept, unambiguously, timing information from a different one of said units which comprises, at each unit, means for generating and registering a signature uniquely designating as of a given instant (*a*) the master unit, (*b*) the distance of said unit from said master unit, (*c*) said unit, and (*d*) the immediate master unit from which said unit directly derives said timing information originating with said master, means for generating a timing signal associated with said signature, means for transmitting the first three designations of said signature, and said timing signal associated therewith, to all units directly interlinked with said unit, means for selecting the smallest of the incoming ones of said designations, as compared with corresponding designations of the previously registered signature, to form, in conjunction with the designation of said unit, a subsequently registered signature therefor, the selection process continuing until said registered signature has a minimum value, whereafter said unit is synchronized with respect to said master, having selected the timing signal originating therefrom, and means for responding to a failure of the master timing signal for reinitiating said selection process to cause said registered signature to attain an alternative minimum value, whereafter said unit is resynchronized, having accepted timing information from said different one of said units.

13. A control circuit at each node of a complex of nodes interlinked by channels of communication, said circuit being one member of an operating system, which comprises means for transmitting and receiving with respect to each adjoining node interconnected with said first-named node, a distinctive signal generated at each interconnected node and containing timing information and supervisory information, said timing information constituting a train of equally spaced pulses and said supervisory information consisting of a three-digit signature, the digits thereof respectively identifying the master node from which timing information at said adjoining node is derived, a measure of the remoteness of said adjoining node from said master node, and the identity of said adjoining node, a register for storing the digits of the signatures received at each node, means for initially storing the self-signature of each node in its register, means for comparing the signature thus stored with successive ones of the incoming signatures and causing the minimum one thereof, which is less than said self-signature, to be stored in said register whereby timing information selected to direct operations at each of said nodes is determined by the minimum signature available thereat and said complex is organized so that the selected timing information originates at a primary master node and is unambiguously derived by way of an immediate master node that forms a part of a shortest path linking said primary master node to said first named node.

14. Apparatus as defined in claim 10 further including monitor alarm means for detecting the failure of said signal containing said minimum signature, delay means operative for a predescribed time interval in response to said monitor alarm means for inhibiting the signature comparison means and restoring said self-signature to storage, whereby reorganization of said complex commences on termination of said time interval, for said failure occurring at said primary master node, to accept unambiguously the timing information originating at an alternative primary master node different from said first-named primary master node, and for said failure occurring at said adjoining node, to accept timing information originating at said primary master node and unambiguously derived by way of an alternative immediate master node different from said first-named immediate master node.

15. Similar control circuits for synchronizing the operating units of a system, one of said circuits being positioned at each node of a complex of said units and interconnected with others of said circuits by channels of communications, each of which circuits comprises means for registering a signature constituted of four digits $D_1$, $D_2$, $D_3$ and $D_4$, respectively, as signifying the momentary primary master unit for said node, the distance between said node and said momentary primary master unit, the identity of said node, and the distinctive immediate master unit for said node, means for transmitting to each adjoining node the digits $D_1$, $D_2$ and $D_3$ as a partial signature, means for receiving at each node all incoming partial signatures, means for increasing each incoming digit $D_2$ by a single unit, means for comparing each incoming partial signature as thus modified with respective registered digits $D_1$, $D_2$ and $D_4$, means for substituting the smallest modified sequence of digits $D_1$, $D_2$ and $D_3$ for the registered sequence of digits $D_1$, $D_2$ and $D_4$ larger than said smallest sequence to form a newly registered four-digit signature with originally registered digit $D_3$ unaltered, means for repeating the transmission, reception, comparison, and registration of said partial signatures until the registered signature at each node of said units has attained its minimum value, whereupon said system is organized with each unit thereof accepting synchronizing information transmitted over an optimum path from a uniquely designated primary master unit.

References Cited in the file of this patent

UNITED STATES PATENTS

| | | |
|---|---|---|
| 2,670,463 | Raymond et al. | Feb. 23, 1954 |
| 2,713,157 | Collins | July 12, 1955 |
| 2,827,516 | Morris | Mar. 18, 1958 |

FOREIGN PATENTS

| | | |
|---|---|---|
| 769,305 | Great Britain | Mar. 6, 1957 |